Dec. 18, 1928.
B. F. FORSYTH
CONVEYER
Filed June 19, 1925
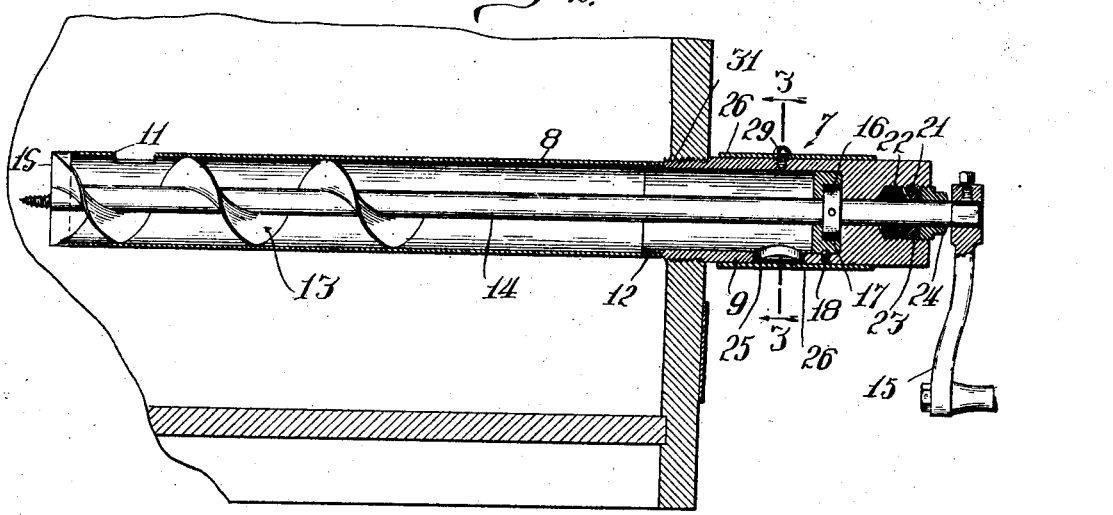
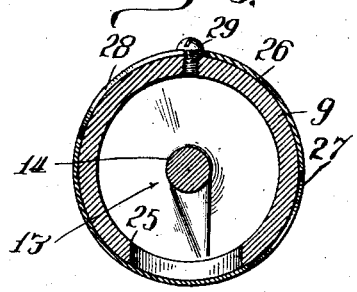
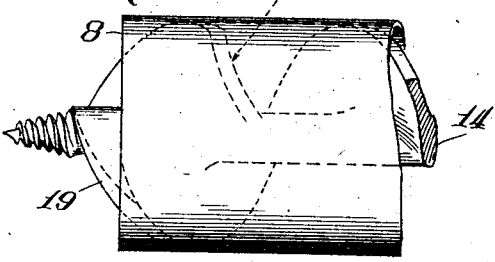
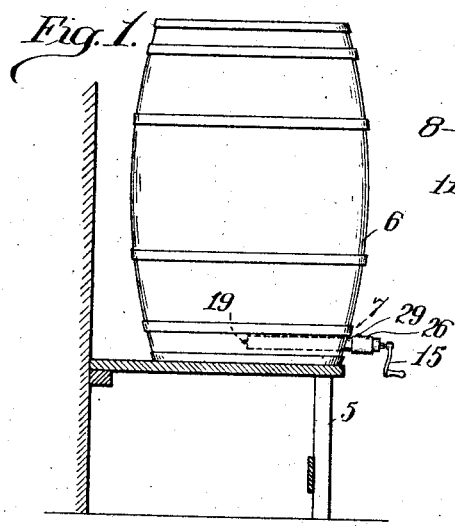
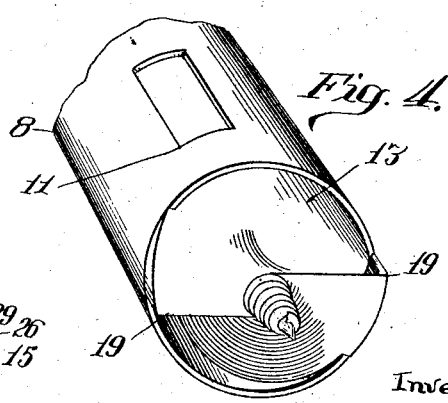
Inventor
Benjamin Franklin Forsyth Patented Dec. 18, 1928.

1,695,277

UNITED STATES PATENT OFFICE.

BENJAMIN FRANKLIN FORSYTH, OF CHICAGO, ILLINOIS.

CONVEYER.

Application filed June 19, 1925. Serial No. 38,279.

The invention relates generally to conveyers and particularly to a conveyer adapted to remove viscous material such as glue, putty or the like from a container.

An object of the invention is to provide a device that can be inserted in a container such as a barrel or the like and be held securely therein and adapted to remove heavy material from the container.

Another object of the invention is to provide an ejecting conveyer having an auger-bit formed on its end, arranged to be used to cut a hole of the proper size in the container to hold the casing and to cut into the contents of said container to force it out.

Another object of the invention is to provide a conveyer with means for forcing material from a container into the conveyer casing from the end, and also having an opening on top to permit any material that will, to fall into the conveyer casing by gravity.

Another object of the invention is to provide the portion of the conveyer casing extending beyond the container with an outlet opening and means for closing and sealing it substantially hermetically.

Another object of the invention is to provide a relatively simple method of mounting the device in the barrel after the auger-bit has cut the hole therein.

Another object of the invention is to provide means for preventing axial displacement of the rotatable conveyer in either direction and to provide means for operating said conveyer.

The foregoing and such objects and advantages as may be pointed out or appear as this description proceeds are attained in the preferred structural embodiment illustrated in the accompanying drawings wherein:

Fig. 1 is a side elevational view showing a barrel with the device of the present invention shown in operative position.

Fig. 2 is a longitudinal sectional view through the conveyer and a vertical section through a fragment of the container.

Fig. 3 is a cross sectional view taken on line 3—3 of Fig. 2.

Fig. 4 is a fragmental perspective view showing the auxiliary inlet opening and the auger-bit.

Fig. 5 is an elevational view showing the auger-bit casing and a portion of the screw conveyer.

In Fig. 1 of the drawings 5 indicates a stand upon which the container or barrel 6 is supported, and 7 represents the conveyer as a whole mounted in operative position.

The conveyer casing is made in two sections 8 and 9. The section 8, as illustrated, is of tubular formation and is provided with an opening 11 in its upper surface, to permit material from the container to drop therethrough by gravity, into the path of the screw conveyer. One end of the casing 8 is provided with internal threads 12, adapted to engage the companion external threads provided on one end of the other section 9 of the casing.

The casing section 9 has a relatively large bore extending for a portion of its length, and a concentric bore of reduced diameter extending from the first named bore through the remaining part of the casing section 9, which latter bore functions as a bearing for the shaft of the conveyer.

A screw conveyer 13 of the conventional type is rotatably mounted within the casing 8 and has an auger-bit 19 formed integral therewith on the end. This auger-bit serves to bore the hole in the side of the barrel in which the device is mounted, and thereafter assists in discharging the contents of the barrel. It will be noted that this auger-bit is of a diameter substantially equal to the outer diameter of the tubular casing section 18. A central shaft 14 extends from the conveyer outwardly through the bore of reduced diameter, formed in the section 9 of the casing, and has operating means, such as a crank 15 secured thereto.

A collar 16 is secured to the shaft 14 by means of a counter sunk set screw or the like, to prevent axial displacement of the shaft. A female collar 17 is provided to fit over the collar 16, and is held fixedly in the casing by means of set screws, such as 18, and is arranged to prevent axial displacement of the auger-bit toward the casing end. Any end thrust in the opposite direction may be carried by contact between the auger-bit 19 and the end of the casing section 8, or between the collar 16 and the end bearing portion of the casing section 9.

An internally threaded bore 21 is provided in the end of the casing section 9, to permit of packing 22 being placed therein. A gland 23 is slidably fitted over the shaft 14, to be adjusted to position by the gland nut 24.

An outlet opening 25 is provided in the casing section 9, having a rotatable closing member 26 snugly fitted thereover. A companion opening 27 provided in the closing member of substantially the same size as the opening 25 is arranged to register with it in one position, and to close it in another position. A slot 28 is provided in said closing member to engage a screw 29, providing a stop, to limit its angle of rotation.

The auger-bit is usually placed to engage the container at approximately the location of the bung hole; it then drills out the bung hole or a part of it, and forces itself inwardly; whereupon the threaded portion 31 of the casing section 9 is screwed into the hole cut in the barrel wall by the auger-bit, which securely holds the device in the barrel. The closing member 26 is next revolved until its opening registers with the opening in the casing. It will be obvious that as the crank is turned the conveyor will force the material in the barrel outwardly through the casing and discharge it through the outlet opening.

I do not intend to be limited to the particular details herein shown and described, as it will be obvious that the foregoing is merely an exemplary embodiment of the invention.

I claim:

1. In a conveyer discharging device for insertion in barrels and like containers, a bit for boring through the wall of the barrel, a screw conveyer in continuation of said bit, and means for supporting said screw conveyer in said barrel.

2. In a conveyer discharge device for insertion in barrels and like containers, a bit for boring through the wall of the barrel, a screw conveyer in prolongation of said bit, and a tubular member enclosing said screw conveyer for extending into the barrel.

3. In a conveyer device for insertion into barrels and like containers, a bit for boring through the wall of the barrel, a screw conveyer on said bit extending into the barrel, a tubular member therefor having an inlet port in the periphery thereof located inside of said barrel and a peripheral outlet port located outside of said barrel, and means for actuating said conveyer.

4. In a conveyer device for insertion into barrels and like containers, a tubular member, a screw conveyer in said tubular member, a bit in prolongation of said screw conveyor and of a diameter substantially equal to the outer diameter of said tubular member, means for securing said tubular member in the opening in the container cut by said bit, and means for rotating said conveyer and bit.

5. In a discharging device, a casing, a conveyer therein, an auger-bit formed integral therewith, and means for operating said conveyer.

6. In a discharging device, a casing, a conveyer, an auger-bit operatively connected to said conveyer, means for preventing axial displacement of said conveyer, an auger-bit and means for operating said conveyer and auger-bit.

7. In a discharging device, a casing having an outlet, a conveyer rotatably mounted in said casing, means for operating said conveyer, an auger-bit operatively associated with said conveyer, means for preventing axial displacement of said conveyer and said auger-bit and means arranged to selectively open or close said outlet.

8. In a device of the character described having a container arranged to carry a casing in combination, a casing carried in said container and having an outlet, a screw conveyer mounted in said casing, an auger-bit operatively associated with said conveyer, means for preventing axial displacement of said conveyer and said auger-bit, means for operating said conveyer and means for selectively opening the outlet and closing it.

9. In a discharging device, a casing, a conveyer rotatably mounted in said casing, an auger-bit of greater diameter than the inside diameter of said casing operatively connected with said conveyer to prevent axial displacement in one direction, means preventing axial displacement in the opposite direction and means for operating said conveyer.

In testimony whereof I affix my signature at 10 South La Salle Street, Chicago, Illinois.

BENJAMIN FRANKLIN FORSYTH.